T. H. KRUEGER

Jan. 5, 1932. TAPE SERVING DEVICE Re. 18,322

Original Filed Sept. 6, 1923 3 Sheets-Sheet 1

Jan. 5, 1932.

T. H. KRUEGER

TAPE SERVING DEVICE

Original Filed Sept. 6, 1923 3 Sheets-Sheet 2

Re. 18,322

Theodore H. Krueger
INVENTOR

BY Munn, Hammond & Mott
ATTORNEYS

T. H. KRUEGER

Jan. 5, 1932. TAPE SERVING DEVICE Re. 18,322

Original Filed Sept. 6, 1923 3 Sheets-Sheet 3

Theodore H. Krueger
INVENTOR

BY Moser, Hammond & Potts
ATTORNEYS

Reissued Jan. 5, 1932

Re. 18,322

UNITED STATES PATENT OFFICE

THEODORE H. KRUEGER, OF PUTNEY, STRATFORD, CONNECTICUT, ASSIGNOR TO BETTER PACKAGES, INC., OF NEW YORK, N. Y., A CORPORATION OF NEW YORK

TAPE SERVING DEVICE

REISSUED

Original No. 1,638,815, dated August 9, 1927, Serial No. 661,168, filed September 6, 1923. Application for reissue filed August 21, 1931. Serial No. 558,615.

This invention relates to devices for serving sealing tape. It is particularly concerned with mechanism for delivering pieces of gummed paper tape in a moistened condition ready for application to parcels, wrappers and the like.

The invention contemplates a machine comprising a table member in which is mounted a guide for the tape, a mechanism for applying moisture to the tape as it is fed out of the machine, a mechanism mounted to ride on the guide for feeding the tape through the guide and through the moistener, and mechanism for severing the tape, which mechanism is interposed between the moistener and the guide.

One feature of the present invention consists in providing a construction whereby the table member is mounted at a convenient height from the base of the machine, so that a parcel may be held under the tape as it issues from the machine and be directly applied to the package by merely forcing the moistened surface into contact with the package. Handling of the moistened surface of the tape is thus made unnecessary.

Another feature of the invention consists in providing the feed mechanism and the severing mechanism with operating members or finger pieces substantially in alignment with each other so that the operator, by a natural, continuous motion of the hand towards himself, is enabled to operate the feeder and the cutter, these parts being so arranged, that at the end of the feed stroke the hand passes naturally off the finger piece of the feeder to the finger piece of the cutter.

The feeding and the severing mechanisms are provided with springs whereby after each operation, they are automatically returned to their initial positions without further action on the part of the operator. The feeding operation is accomplished by means of the feeder, so that the tape need not be pulled manually out of the machine, as in certain constructions of the prior art in which the feeding mechanism serves only to initiate the feed, requiring the desired length of tape to be pulled out manually. During the feed stroke, the tape is automatically passed through the moistener and is thus caused to leave the machine in a thoroughly moistened condition. In this manner, the operator is enabled to feed out the tape, to moisten it and sever any desired length of it without having to touch the tape during the process.

A further feature of the invention consists in providing a one-piece sheet metal guide for the tape, which guide serves simultaneously as a track or slide for the tape-feeding mechanism. The invention, moreover, provides additional guide means whereby the tape is guided from the severing mechanism into and through the moistening mechanism so that buckling of the tape is absolutely prevented throughout its entire path in the machine.

The invention provides further a moistening mechanism in which a self-adjusting pressure member is caused to hold the tape in engagement with the moistening member, so that the tape engages the moistening member with substantially uniform pressure irrespective of variations in the position of the moistening member. The last-named member is preferably in the form of a brush extending upwardly from a reservoir, as disclosed and claimed in my U. S. Patent No. 1,567,655.

A further feature of the invention consists in the construction of the carriage whereby the same is normally held out of engagement with the tape and is caused to engage the tape for feeding the same through the guide only when its handle is held depressed. This permits the operator to move the carriage into any desired position before beginning the feeding stroke, thus enabling him to make only a portion of the feed stroke or several full feed strokes before operating the severing mechanism, so that he may obtain any desired length of tape.

The above and further features of the invention which will appear fully hereinafter, will now be described in connection with a preferred form of embodiment thereof, reference being had to the accompanying drawings, in which.

Similar characters of reference designate similar parts in each of the several views.

Figure 1:
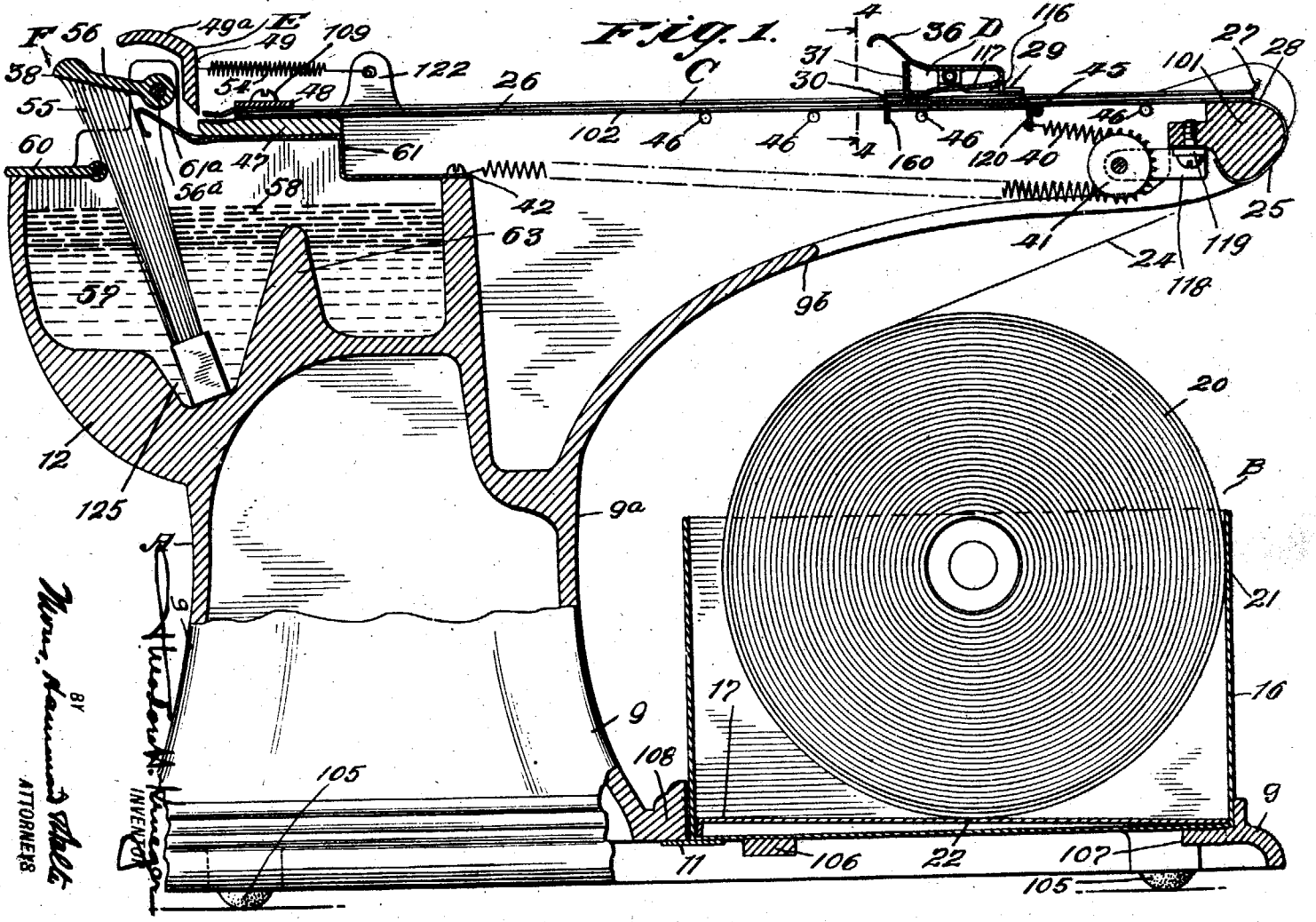
Figure 1 is a vertical sectional view of one form of embodiment of the invention.
Figure 2:
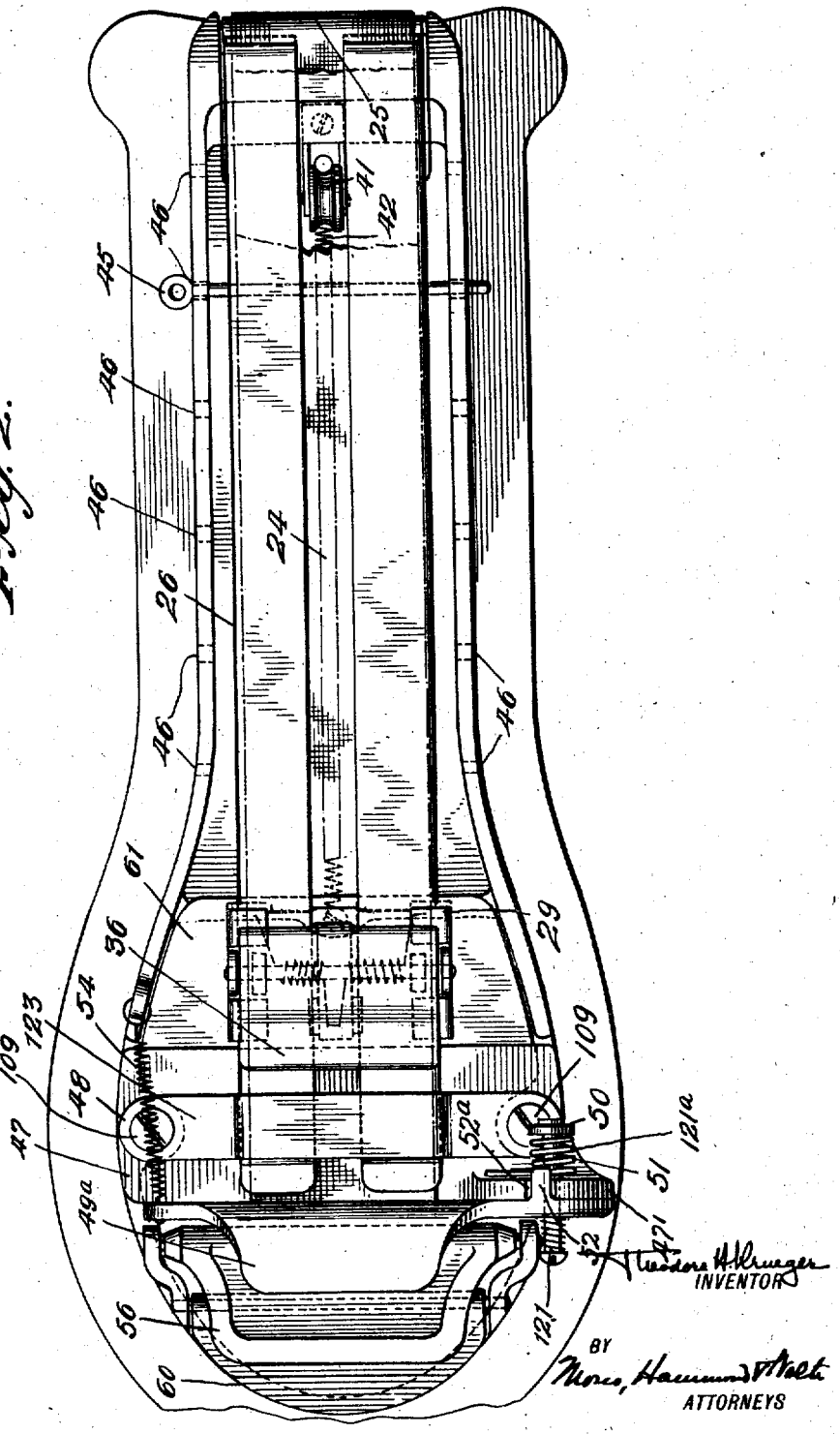
Figure 2 is a top plan view of Figure 1.
Figure 3:
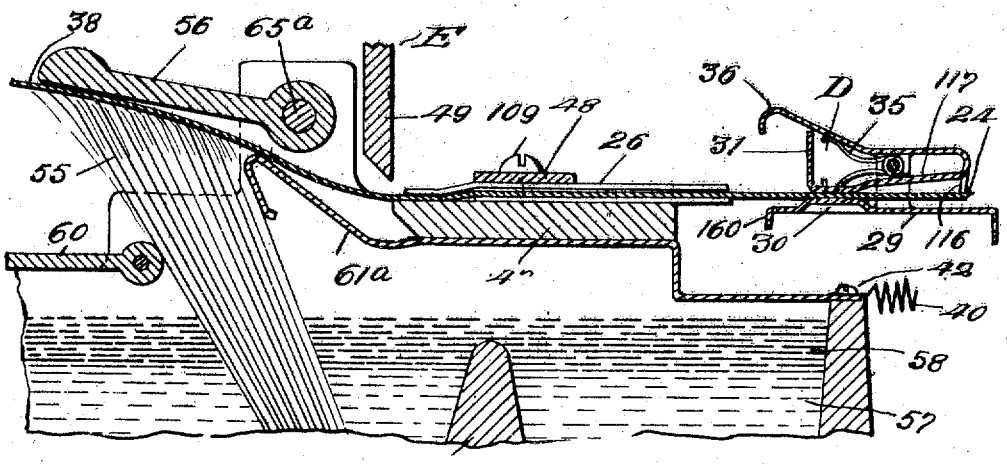
Figure 3 is an enlarged sectional view of part of the machine.

The machine as illustrated in the drawings, comprises a standard or frame A, a tape-receiving member B, a tape-guiding means C, a tape-advancing means D, a tape-severing mechanism E and a tape-moistening means F.

The frame A is preferably constructed of cast metal and consists of an elongated base or pedestal 9, an upright or standard 9*a*, provided at the forward end of the pedestal, and a member 9*b*, which member is in the form of a cantilever extension from the upper end of the standard and extends parallel to the pedestal. The entire frame is shaped so that it may be cast in one piece, as shown in the drawing, but of course it may be formed of several parts bolted together, if desired. The pedestal is provided with foot members 105 of soft rubber or similar material, so that the machine may be placed on a polished surface, such as that of a store counter, without danger of scratching or otherwise marring the same.

Figure 5:
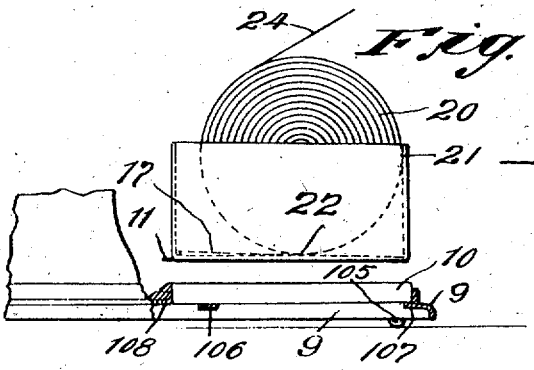
Figure 5 is a view illustrating the manner in which the tray for the roll of tape is supported in the pedestal.

The rearward end of the pedestal is provided with a recess 10 (Figure 5) for receiving the tray 16, which, in the present form of embodiment, constitutes the tape-receiving means B. The tray is supported in the recess by means of cross members 106 and 107 cast integral with the pedestal, and is retained in this position by means of a tongue 11 which is secured to the bottom of the tray and which, when the tray is in place, extends under the shoulder 108 of the pedestal. By merely tilting its rearward end upward, the tray may readily be detached from the pedestal when a new roll of tape is to be inserted, but accidental displacement of the tray, as by pull on the tape, is effectively prevented.

It may here be noted that as the roll is unwound by pull on the tape 24, the roll is caused to engage both the end wall 16 and the bottom wall 17 of the tray. Two points of contact, 21 and 22, are thus provided between the roll and the tray with the result that frictional resistance is caused to retard the unwinding of the roll. The tape is thus held taut and the roll is prevented from loosening its outer layers by continuing its rotation after the pull on the tape has ceased. A sloping bottom 17 may be provided to hold the tape continually in engagement with wall 16.

Figure 4:
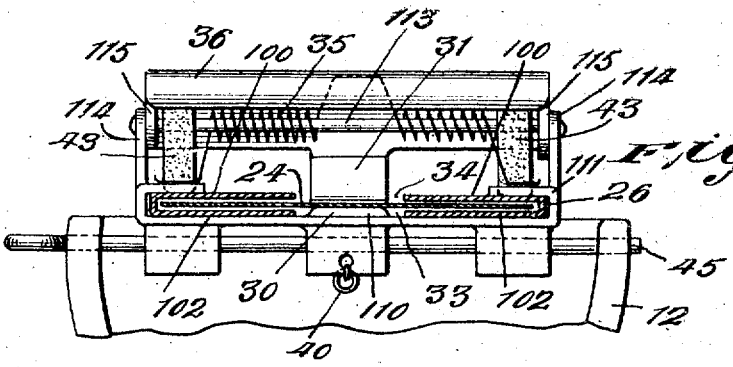
Figure 4 is a front elevation of the feeding mechanism.

From roll 20 the tape 24 passes into the guiding means C, which means is mounted on the table member 9*b* of the casting. The guiding means, in the preferable form of construction, consists of a single piece of sheet material 26 provided with flanges 100, (Figure 4) which flanges are folded over toward each other so as to constitute, together with the center portion 102 of the strip, a guideway for the tape.

A slot 33 is provided along the middle of the center portion 102, so as to expose the lower surface of the tape in the guideway, and the adjacent edges of the folded over flanges are separated from each other by a distance substantially equal to the width of the slot, so as to expose the upper surface of the tape. The tape, therefore, as it passes through the guide, is closely confined along its edges and thus straightened out, but is left exposed on top and bottom along its center line for the purpose of being engaged by the tape-advancing means D, as hereinafter described.

At the entrance end of the guide, the flanges are provided with upturned lips 27, to enable the tape to be readily introduced. The center portion 102 of the guide is extended beyond lips 27 to form an apron 25, which apron serves not only to form a bearing surface for the tape entering the guide, as readily apparent from Figure 1, but also as a clamp for securing the entrance end of the guide to the table member, for which purpose the apron is bent into a shape such as to embrace a cross-piece 101 provided in the cantilever portion 9*b* of the frame. The other end of the guide is secured to the forward end of the table member by means of screws 109, as hereinafter described.

The means D for advancing the tape through the guide C consists in the preferred form of embodiment of a slider 29 provided with a pivoted finger-piece 36. The slider consists of a single piece of sheet material 110 provided with pairs of flanges 111 and 112 folded over the edges of guide 26, so as to permit of free sliding movement between the slider and the guide.

It will thus be seen, that in accordance with this invention, the means constituting the guide for the tape serves also as the bearing surface or slide for the tape-advancing device. The finger piece 36 is pivoted to the slider by means of a pin 113 which passes through upwardly extending lugs 114 integral with the slider and through depending lugs 115 integral with the finger-piece. A spring 35 coiled about pin 113 serves to hold the finger-piece normally in such position that a pair of lugs 116 integral with the finger-piece are in engagement with the previously mentioned flanges 111 and 112 of the slide. In this position the slider is free to be moved backward and forward on the slide without causing movement of the tape in the slide.

For the purpose of causing the slider to engage the tape, the finger-piece 36 is provided at its center with an extension 117, which extension is curved backwardly under the finger-piece to provide a jaw member 31, which jaw is adapted to cooperate with a raised portion 30 in the slider to constitute a mechanism for gripping the tape. A slight pressure on the finger-piece 36 is thus sufficient to cause the tape to be gripped between jaws 30 and 31 and to be moved with the slider. As soon as the pressure on the finger-piece is relieved, the jaw member 31 is tilted by means of spring 35 out of engagement with the tape, so that further movement of the slider is not transmitted to the tape.

It will thus be understood that with the finger-piece 36 depressed, forward movement of the slider will advance the tape through the guide and through the severing and moistening means hereinafter described. Return movement of the slider is made automatic by means of a biasing mechanism such as the spring 40, one end of which is anchored in the casting by means of a screw 42, and the other end of which is secured to a depending lug 120 of slider 29. The intermediate portion of the spring passes over a grooved roller 41 mounted to rotate freely in a bracket 118 fixed to the cross bar 101 of the casting by means of a screw 119.

At the end of the forward or feeding stroke of the slider, the operator merely releases the finger-piece 36 so that the jaw member 31 is tilted out of engagement with the tape and the slider is returned to its original position by the tension of spring 40. The backward movement of the slider is terminated by the engagement of the lug 120 with a pin 45, which pin may be inserted into any one of a number of holes 46 provided in the upper edge of the casting. The length of tape fed by a single operation of the advancing means may thus be automatically controlled.

The tape which is fed out of guide 26 is caused to enter the severing mechanism E. This mechanism consists of a stationary horizontal blade 47 secured to the casting by screws 109, and a movable vertical blade 49 which is pivoted by means of a pin 51 on a lug 47′ integral with the lower blade 47. By thus making the lower blade of the shear or severing mechanism flat or horizontal, the height of the shear above the moistening tank may be reduced and the tape guide brought nearer the moistening tank so that the moisture will only have to be conveyed a short distance above the tank to moisten the tape. A lug 52 on the movable blade is arranged to cooperate with a notch 52*a* of the blade to limit the arc of movement of blade 49. A spring 121 on pin 51 serves for the purpose of holding the shear members 49 and 47 in close engagement at their pivotal ends. A second spring 121*a* is mounted to engage the lug 52 at its outer end for the purpose of forcing the remote end of the movable blade into engagement with the stationary one. In this action spring 51 is assisted by a spring 54 fastened to the free end of blade 49*a* and to a lug 122 of the casting. The combined action of the springs 51, 121 and 54 serves to keep the shear blades in firm engagement, so that the tape will be sheared cleanly when the upper blade is depressed. Spring 51 serves for the further purpose of biasing the upper blade to an open position so that the tape is free to pass beneath the blade into the moistening means F. A flange 49*a* is provided on the upper edge of the movable blade for being engaged by the operator's finger when the shear is to be actuated.

A stripper 123 is provided to hold the tape down at the point where it enters between the shear blades, this stripper being formed of sheet metal and being provided with a raised portion 124 for receiving the end of the guide 26. It thus serves for the further purpose of anchoring the forward end of the guide. Screws 109 serve to hold the stripper in place.

From the severing device E, the tape passes into the moistener F, which moistener, in the present form of embodiment, consists of a brush 55, the butt end of which is submerged in water provided in a tank 57 formed in the upper end of the upright member 9*a* of the casting. Rapid evaporation of the water may be prevented by providing a film of oil, as indicated at 58. A pivoted lid 60 provided in the forward end of the tank serves to permit of the introduction of water into the compartment. The position of the butt end of the brush is fixed by a recess 125 provided in the bottom of the tank, and the outer ends of the bristles are confined between the edge of lid 60 and the edge of a sheet metal cover 61 secured on the top of the tank by means of screw 109 and 42. The forward end 61*a* of the cover is bent upwardly so as to cause the tape issuing from guide 26 to pass between the ends of the bristles 55 and a weighted flap piece 56 which is freely rotatable about pivots or fulcrums 56*a* provided in casting A. The pivot or fulcrum line 56*a* is arranged substantially parallel to the normal face of the brush bristles and at right angles to the path of travel of the tape, so that the flap piece or pressure member 56 bears with uniform pressure over the entire width of the brush bristles and prevents uneven moistening of any part of the tape.

The hairs of the brush, by capillary attraction cause moisture to rise to the tip of the brush which because of the use of a lower flat shear blade 47 need not be very long so that the bristles are continously kept in a moistened condition. The flap piece 56 is so constructed that the downward pressure occasioned by its own weight is sufficient to force the entire gummed surface of the tape into intimate contact with the hairs of the brush. The pressure which is thus created between the tape and the resilient ends of the bristles maintains a constant film of water between the end of the brush and the pressure member and causes the moisture of the bristles to be applied evenly over the entire gummed surface of the tape as the same is passed over the brush so that no part of the gummed surface remains unmoistened. By virtue of the resiliency of the bristles the moisture is applied evenly and there is no excessive and undesirable wetting of the tape in some places and no insufficient moistening at other places. The free pivotal mounting of the member 56 serves to hold the surface of the tape in proper engagement with the brush and irrespective of variations in the position of this end, as may be occasioned, for example, by slight differences in the position of the butt of the brush within recess 125. The member 56 constitutes thus a self-adjusting pressure bar for forcing the tape into proper contact with the brush.

The brush may be readily removed from the tank 57, as for purposes of cleansing, by merely pulling it out by the bristles, and it may be returned into its proper place by merely dropping it, butt end first, into the tank. A projection 63 is provided in the tank for guiding it into the recess 125.

The operation of the machine will now be readily understood.

To obtain a piece of moistened tape, the operator merely places his fingers on the member 36 and, holding this member depressed so that the tape is clamped between jaws 31 and 30, pulls the feed carriage towards himself, until its motion is arrested by the engagement of lug 160 of the slider with the rear edge of plate 47. During this operation, the end of the tape, which at the time of commencement of the feed stroke was in guide C, is advanced through the moistener and projected outwardly therefrom with its moistened surface undermost ready for application to the package or parcel for which it is intended. At the time when the feed motion of the carriage is arrested, the finger member 36 of the carriage is a short distance from the finger member 49*a* of the severing mechanism. When, therefore the carriage is brought to a stop, the operator releases the same by continuing the motion of his hand, thus drawing his fingers off the member 36 and placing them upon the finger portion 49*a* of the severing mechanism E. His hand is thus automatically placed into position for operating this mechanism. This operation is effected by simply depressing the shear blade. The severed piece of tape equal in length to the distance of movement of the feed carriage, extends outwardly from the forward end of the machine, as already mentioned, and is retained in this position by virtue of the engagement of the pressure bar 56 with the brush 55.

The above-described entire feeding and severing operations are carried out by one hand of the operator, ordinarily the right hand. In the other hand the operator will usually hold the parcel or package to which the tape is to be applied. As the tape issues from the moistener, he will hold the parcel below the mouth of the moistening mechanism, so that the tape, as it issues from the machine, extends over the portion of the surface of the parcel to which it is to be applied. When the right hand has completed the feeding and moistening movements, it is in position to press the moistened surface of the tape into contact with the parcel, so that handling of the moistened side of the tape is entirely unnecessary.

If, for any reason, it is impracticable to hold the parcel in front of the machine, the operator will perform the feeding and severing operations as above, but thereupon use his right hand to take the tape out of the machine and place it on the parcel to which it is to be applied. In transferring the tape to the parcel, the operator holds it by the edges so as to slightly bow it transversely. In this manner, contact with the moistened surface is entirely avoided.

Because of the correlation between the various parts of the machine, either of the above-described manners of operation may be effected by a simple and substantially continuous movement of the hand.

The length of the piece of tape fed out of the machine may be controlled by the operator, at will, by completing only a partial feed stroke or making several full feed strokes before releasing the feeder and operating the severing mechanism. In the usual case, however, it will be desired to withdraw the same amount of tape from the machine at each operation. This amount may be regulated by means of the stop pin 45 which may be placed into one of the openings 46, as hereinabove explained.

When a new roll of tape is to be placed into the machine, the tray 16 is removed from the pedestal, as hereinbefore explained, the new roll being placed into the tray in such position that upon unwinding it will be urged against the back wall 16 of the tray, as hereinbefore described. The loose end 24 of the roll is then inserted into the guide, whereupon the machine may be operated in the usual manner.

When the tape is provided with printed or advertising matter on its ungummed surface, the table member is preferably provided with an index device, which will indicate to the operator how far to insert the tape in order that each piece of tape fed out of the machine will have the printed matter thereon in the desired location. The use of such an index member is rendered possible in the present construction, because the guide C is on top of the table and the upper surface of the tape in the guide is exposed to view, as hereinbefore explained.

The machine, moreover, may be provided with a dog for preventing backward movement of the paper tape in case an operator, not fully acquainted with the proper operation of the machine, should hold the finger-piece 36 depressed during a backward movement of the slider.

Although I have herein shown and described only one specific form of embodiment of the invention, it will be readily understood that many changes and modifications may be made thereon within the scope of the following claims without departing from the spirit and scope of the invention, it being my intention to claim the same as broadly as the state of the prior art, will permit.

I claim:

1. In a device for moistening gummed tape, in combination, tape feeding means for feeding the tape, tape severing means, tape moistening means beyond the severing means comprising a brush element and a presser element jointly forming a tape receiving mouth, supporting means for said elements supporting the brush element at one side of the path of tape movement and the presser element at the opposite side thereof so that the mouth of the moistening means is always in alignment with the path of tape movement to receive the end of the advancing tape, said supporting means and presser element jointly forming self-adjusting means for maintaining the gummed side of the tape in engagement with the moistening surface of the brush when the tape is present between them and for maintaining the brush and the presser element in contact with one another to maintain a film of water at the tape engaging end of the brush when no tape is present between them.

2. In combination, a device for applying moisture to tape, including a brush and a pivoted weighted member resting freely on said brush for forcing the tape into contact with the moistening surface of said brush.

3. In combination, a device for applying moisture to tape, including a liquid supplier, means for conveying the liquid by capillary action from said supplier to said tape, and a pivotally mounted weighted member for holding said tape in contact with said liquid conveying means.

4. In a tape moistening mechanism, a brush, means for applying moisture to said brush, and pivoted gravity operated means resting freely on said brush for holding the surface of the tape with uniform pressure in contact with the bristles of the brush.

5. In combination, a device for applying moisture to tape, said device comprising means constituting a reservoir and a brush for conducting liquid upwardly out of said reservoir, and a freely pivoted member for engaging the upper surface of tape passed over the brush so as to cause the lower surface of the tape to engage the ends of the bristles with substantially uniform pressure irrespective of variations in the position of the brush.

6. In combination, means constituting a reservoir, a brush for conducting liquid outwardly from said reservoir, means in said reservoir for receiving the butt end of the brush, means for supporting the upper end of the brush so that the axis of the brush is slightly inclined to the vertical, a pressure member mounted to engage tape passed over the upper end of the brush with substantially uniform pressure irrespective of variations in position of the brush, and means for guiding the tape between the pressure member and the brush.

7. In combination, means constituting a reservoir, a brush for conducting liquid outwardly from said reservoir, means in said reservoir for receiving the butt end of the brush, means for supporting the upper end of the brush so that the axis of the brush is slightly inclined to the vertical, a pressure member in contact with said brush at all times said brush and said pressure member being relatively movable about an axis substantially parallel to the normal position of the brush tip whereby the pressure member engages tape passed over the upper end of the brush with substantially uniform pressure irrespective of variations in position of the brush, and means for guiding the tape between the pressure member and the brush.

8. In combination, means constituting a reservoir, a brush for conducting liquid outwardly from said reservoir, means in said reservoir for receiving the butt end of the brush so that the axis of the brush is slightly inclined to the vertical, a pressure member mounted to engage tape passed over the upper end of the brush with substantially uniform pressure irrespective of variations in position of the brush, a cover for said reservoir, and a lip on said cover inclined upwardly for passing the tape between the pressure member and the brush.

9. In a tape serving device including means to render one surface of said tape adhesive, a guide for tape comprising an integral strip of sheet metal having a longitudinal slot therein and provided with turned-over flanges for forming a channel for the tape, and a tape-advancing member mounted to slide on said guide.

10. In a tape serving device, a guide for tape comprising an integral strip of sheet metal having a longitudinal slot therein and provided with turned-over flanges for forming a channel for the tape, a tape-advancing member mounted to ride on said guide, said member being provided with flanges for embracing the outer edges of said guide, and means to moisten the tape as it issues from said guide.

11. In a tape serving device, a guide for the tape, means for moistening said tape, means embracing said guide and mounted to slide thereon, said means comprising members adapted to clamp between them the upper and lower surfaces of the tape, and means for moving said members into non-engaging position.

12. In a tape serving device, a guide for the tape, means for severing the tape advanced from said guide and means for moistening said advanced tape, said guide being formed of sheet metal and constructed to enclose the edges of the tape but leaving the central portion thereof exposed, a tape advancing member riding on the edges of said guide, and means associated with said member for engaging the exposed surface of the tape in the guide.

13. In a tape serving machine including means for moistening the tape, means constituting a support, a guide for tape mounted on said support, said guide comprising an integral strip of sheet metal having a longitudinal slot therein and provided with turned-over flanges for forming a channel for the tape and being provided with an extension at one end, a supporting member provided in said support for supporting said extension to fasten said guide in said support and means for feeding the tape from said guide.

14. In combination, a guide for tape, said guide being comprised of a single strip of sheet metal having turned-over flanges for forming a channel for the tape and being provided with a longitudinal slot for exposing the surface of the tape, means for advancing tape through said guide, said means comprising a sheet metal having flanges for engaging the outer edges of said guide so as to be free to ride thereon, tape-engaging means associated with said members, and means for moistening the tape advanced from said guide.

15. In combination, a guide for tape, said guide being comprised of a single strip of sheet metal having turned-over flanges for forming a channel for the tape and being provided with a longitudinal slot for exposing the surface of the tape, means for advancing tape through said guide, said means comprising a member of sheet metal having flanges for engaging the outer edges of said guide so as to be free to ride thereon, and tape-engaging means associated with said member, said means comprising a raised portion in said member for engaging one surface of the tape, and a jaw for cooperating with said raised portion and for engaging the opposite surface of the tape means for pivotally mounting said jaw on said member, resilient means for normally holding said jaw in non-engaging position, and means for moistening the tape advanced from said guide.

16. In a tape-serving means, a pair of clamping devices pivotally associated with each other, one of said devices having a raised portion for normally engaging one surface of the tape, the other of said devices having a jaw portion for at times cooperating with said raised portion to engage the other surface of the tape and clamp the tape between them, resilient means for normally holding said jaw member in non-engaging position, a finger piece integral with said jaw member for at times operating said jaw member to engaging position, and means for moistening the served tape as it emerges from said guide.

17. In a tape-serving device, a frame comprising a pedestal, tape-receiving means on said pedestal, an upright provided at the forward end of said pedestal having a table in the form of a cantilever extension from said upright, a guide for tape mounted in said table portion of the frame, a tape-advancing means mounted to reciprocate on said guide, a tape moistening mechanism mounted on the forward end of the guide, said upright comprising means forming a reservoir for said moistening mechanism, and a tape serving device interposed between said guide and said moistening device.

18. In a tape serving device, hand-operated means for feeding the tape toward the operator, means for rendering the tape adhesive, hand-operated means for severing the fed tape, said feeding and severing means being in alignment so that the hand of the operator will pass in a natural continuous substantially straight line horizontal motion from the said feeding means to the said severing means.

19. In a gummed strip serving device including a guide formed from a single piece of sheet metal, adapted to receive and guide a paper strip through its interior and a paper grasping and advancing device over its exterior, means of supplying said paper strip from a roll without the use of an arbor which comprises a tray having smooth sides and an inclined bottom wall, said bottom wall and one side adapted by frictional contact to retard the unwinding of the roll for the purpose of preventing the unwinding of more than the quantity of paper strip served, and means to moisten the withdrawn strip.

20. In a strip serving device including means to render said strip adhesive, a guide formed from a single piece of sheet metal, adapted to receive and guide a paper strip through its interior and a paper grasping and advancing device over its exterior.

21. In a tape-dispensing device, a guide formed from a single piece of sheet metal to enclose the edges and a substantial portion of the width of a paper strip to prevent its curling or buckling, the exterior of said guide adapted to act as a track for a strip gripping and advancing means, and means to render said strip adhesive as it issues from said guide.

22. In a tape-dispensing device, a combined guide for paper strip and a strip advancing means comprising a single piece of sheet metal formed into a flat tube having a slot therethrough to permit the strip advancing means to engage the paper strips, means to move the strip through said guide, and means to render the strip which issues from said guide adhesive.

23. In a paper strip advancing means, in combination a paper strip guide and a paper strip gripper, embracing, supported by and sliding upon said guide, and having a stationary jaw and a manually movable jaw of cantilever construction, and means to moisten the strip as it is advanced.

24. In a paper strip advancing means including a paper strip guide and a paper strip gripper movable along said guide and having a lower jaw supported in a vertical plane, but movable in a horizontal plane, and an upper jaw hingedly attached to said lower jaw, said upper jaw provided with a finger piece manually operable to bring the two jaws together and to move them in a horizontal plane, and means to moisten the strip as it is advanced.

25. In a paper strip advancing means, in combination a paper strip guide and a paper strip gripper, embracing, supported by and sliding upon said guide, and having a sliding lower jaw supporting a hinged upper jaw provided with a finger piece to close the jaws and to slide the strip advancing means over any portion of a strip guide, and means to moisten the strip as it is advanced.

26. In combination in a tape dispensing device, hand-operated paper strip advancing means, hand-operated cutting means, and moistening means arranged in substantially a straight line and adapted to be operated by a continuous straight line horizontal movement of the operator's hand, said cutting means and advancing means also adapted to work independently.

27. In a tape serving device, a tape guide, hand operated means to feed the tape therethrough, a tank above which the tape is fed, a hand operated tape cutter including a hand actuated, movable, vertical blade, a stationary, flat, horizontal blade situated immediately above the tank and below the path of tape movement, and spring means urging the cutting edge of the vertical blade horizontally toward the cutting edge of the horizontal blade, spring means urging the cutting edge of the vertical blade vertically away from the horizontal blade and means beyond the cutter to moisten the advanced strip of tape, comprising a brush extending upward from the bottom of the tank to the path of tape movement, and a presser cooperative with the brush.

28. In a tape serving device, a tape guide, hand operated means to feed the tape therethrough, a tank above which the tape is fed, a hand operated tape cutter, including a flat, stationary blade mounted directly over the tank and parallel to the plane of the tape strip as it emerges from said guide, and a movable blade acting in a plane substantially at right angles to the tape strip, spring means to hold said movable blade in contact with said stationary blade during the cutting stroke, spring means to hold said movable blade in raised position but manuallly depressible to cut the paper strip and means beyond the cutter to moisten the advanced strip of tape, comprising a brush extending upward from the bottom of the tank to the path of tape movement, and a presser cooperative with the brush.

29. In a dispensing device for gummed paper strip a tray adapted to hold a roll of gummed paper strip, a guide through which the strip passes, a strip grasping device embracing said guide and slidable along the outside thereof to grasp and to advance said strip, a cutter and a moistener to cut and to moisten said strip as it emerges from said guide, said strip grasping device and cutter being arranged in a straight line to facilitate the operation of the machine.

30. In a dispensing device for gummed paper strip, a tray, a guide, a strip grasping device, a cutter and a moistener, said tray of relatively greater length and breadth than a roll of paper strip, said tray bottom inclined to cause the roll contained therein to have always two points of frictional contact with the tray walls as it unrolls, said guide having an internal passage to receive and guide the paper strip from said tray, the outside surface of said guide forming ways for the strip grasping device, said cutter positioned across the said guide and adapted to cut off any section advanced by the said strip grasping means, said moistener provided with a pressure means, a capillary liquid conveying means and multiplex contact means, adapted to moisten the gummed side of the paper strip, and to act as a continuation of the guide.

In testimony whereof I have affixed my signature to this specification.

THEODORE H. KRUEGER.

DISCLAIMER

Re. 18,322.—*Theodore H. Krueger*, Putney, Stratford, Conn. TAPE SERVING DEVICE. Patent dated January 5, 1932. Disclaimer filed June 11, 1935, by the assignee, *Better Packages, Inc.*

Hereby disclaims from the operation of Reissue Letters Patent No. 18,322 claims 1 to 8 of the said Reissue Letters Patent No. 18,322.

[*Official Gazette July 2, 1935.*]